(12) United States Patent
Simmons et al.

(10) Patent No.: US 9,726,326 B2
(45) Date of Patent: Aug. 8, 2017

(54) METHOD OF CONSTRUCTING A STORAGE TANK FOR CRYOGENIC LIQUIDS

(71) Applicant: Chicago Bridge & Iron Company, Plainfield, IL (US)

(72) Inventors: J. Ricky Simmons, Aurora, IL (US); Paul Dyson, San Fernando, CA (US)

(73) Assignee: Chicago Bridge & Iron Company, Plainfield, IL (US)

( * ) Notice: Subject to any disclaimer, the term of this patent is extended or adjusted under 35 U.S.C. 154(b) by 11 days.

(21) Appl. No.: 14/100,577

(22) Filed: Dec. 9, 2013

(65) Prior Publication Data

US 2014/0097189 A1    Apr. 10, 2014

Related U.S. Application Data

(62) Division of application No. 11/758,398, filed on Jun. 5, 2007, now Pat. No. 8,603,375.

(51) Int. Cl.
*B65D 88/00*        (2006.01)
*F17C 3/02*         (2006.01)

(52) U.S. Cl.
CPC ...... *F17C 3/022* (2013.01); *F17C 2201/0104* (2013.01); *F17C 2201/032* (2013.01); *F17C 2201/052* (2013.01); *F17C 2203/0629* (2013.01); *F17C 2203/0678* (2013.01); *F17C 2209/232* (2013.01); *F17C 2221/011* (2013.01); *F17C 2221/012* (2013.01); *F17C 2221/014* (2013.01); *F17C 2221/016* (2013.01); *F17C 2221/017* (2013.01); *F17C 2221/033* (2013.01); *F17C 2221/035* (2013.01); *F17C 2223/0161* (2013.01); *F17C 2223/033* (2013.01); *F17C 2260/011* (2013.01); *F17C 2260/013* (2013.01); *F17C 2270/0136* (2013.01); *Y02E 60/321* (2013.01)

(58) Field of Classification Search
CPC .............. F17C 2203/0678; F17C 3/022; F17C 2203/0639; F17C 2223/0161
USPC .......................... 220/576.2, 565; 264/31, 32
See application file for complete search history.

(56) References Cited

U.S. PATENT DOCUMENTS

| | | | | |
|---|---|---|---|---|
| 2,041,392 | A * | 5/1936 | Bean et al. ................ | 220/567.2 |
| 3,241,703 | A * | 3/1966 | Korin et al. ................ | 206/446 |
| 3,557,558 | A * | 1/1971 | Eakin ...................... | E21F 17/16 405/57 |
| 3,827,135 | A * | 8/1974 | Yamamoto ............. | B63B 25/16 114/74 A |
| 4,165,021 | A * | 8/1979 | Dorling .................. | B65D 90/02 220/586 |
| 4,458,458 | A * | 7/1984 | Orii ...................... | B65D 90/043 220/694 |

(Continued)

*Primary Examiner* — Shawn M Braden
(74) *Attorney, Agent, or Firm* — Osha Liang LLP

(57) ABSTRACT

A new procedure for constructing cryogenic storage tanks involves erecting a freestanding metal liner. The liner is sized and configured to withstand the hydraulic forces the concrete wall of the tank being poured without the need for temporary stiffeners on the inside surface of lower portions of the liner. Lateral tension ties can be connected to anchor ties on an outward surface of the liner and used to tie the liner to outer formwork. These ties may be spaced up to about 2 m apart. Studs can also be provided on the outer surface of the liner, and a cylindrical ring of cryogenic steel can be integrated into the liner.

8 Claims, 11 Drawing Sheets

(56) References Cited

U.S. PATENT DOCUMENTS

| | | | |
|---|---|---|---|
| 4,513,550 A * | 4/1985 | Kotcharian | 52/745.01 |
| 6,286,707 B1 * | 9/2001 | Hall et al. | 220/567.2 |
| 2006/0086741 A1 * | 4/2006 | Bacon et al. | 220/560.12 |
| 2009/0223974 A1 * | 9/2009 | Felius | F17C 3/022 |
| | | | 220/560.12 |

* cited by examiner

*FIG. 12*      *FIG. 13*      *FIG. 14*
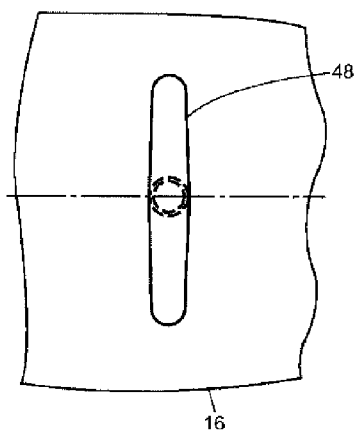 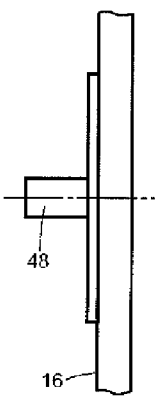 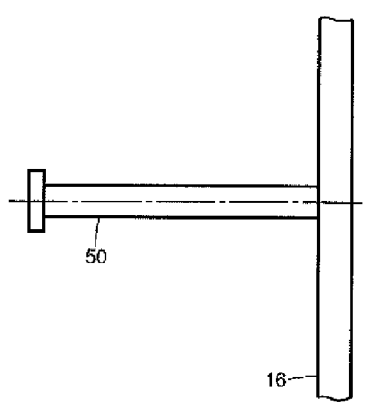

METHOD OF CONSTRUCTING A STORAGE TANK FOR CRYOGENIC LIQUIDS

CROSS-REFERENCE TO RELATED APPLICATIONS

This application is a divisional application and claims benefit under 35 U.S.C. §120 to U.S. patent application Ser. No. 11/758,398, filed on Jun. 5, 2007, now U.S. Pat. No. 8,603,375, which is incorporated by reference in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

The present invention relates generally to storage tanks for cryogenic liquids, and more particularly to "double" and "full" containment storage tanks for cryogenic liquids.

Liquefied natural gas (LNG) is transported and frequently stored at temperatures around −261 F (−163 C). Other gases commonly stored in liquid phase below ambient temperatures include ammonia, propane, butane, LPG, ethylene, oxygen, argon, nitrogen, hydrogen, and helium. LNG storage tanks are generally field-erected vessels in sizes of 315,000 to 1,000,000 barrels (50,000 to 200,000 cubic meters).

It is not uncommon for storage tanks for these liquids to have a form of secondary containment. Free-standing tanks often include an inner tank made of stainless steel, aluminum, 9% nickel steel, or other materials suitable for low-temperature or cryogenic service. An outer concrete containment wall can provide secondary containment in the event of a leak in the inner tank. To reduce heat transfer, the inner tank is usually spaced away from the inside surface of the concrete wall, leaving room for thermal insulation. A liquid or vapor barrier on the inside surface of the concrete wall can prevent outside moisture from penetrating the insulation and prevent LNG vapors from escaping to the outside.

Conventionally, the barrier is created using a "paste-on" process or a "stiffened liner" process. In the paste-on process, a thin steel facing is attached to strips of steel that are embedded in the concrete when the concrete wall is poured. In the stiffened liner process, a liner is prepared as part of the inner formwork that the concrete wall is formed against. Internal stiffening is included in the formwork to resist the loads when the wet concrete is poured. After the concrete has set, the internal stiffening is removed, leaving the liner on the inside surface of the concrete.

Conventionally, a roof for these kinds of tanks is constructed in the interior space within the outer wall, and this only begins once the concrete wall has been poured and any formwork or stiffening needed for pouring the wall has been removed from the lower area. Using the conventional processes, significant time is needed between the start of work on the outer wall and the start of work on the roof. In environments where weather can significantly limit the season for outdoor work, shortening this schedule can be beneficial.

BRIEF SUMMARY

A new procedure has been developed that may permit the schedule for construction of cryogenic storage tanks (and in particular double-containment or full-containment storage tanks that have a distinct primary containment wall spaced inwardly from the liner) to be shortened by as much as three or four months.

In this new procedure, a freestanding inner steel liner is erected. The liner is sized and configured to withstand the hydraulic forces of wet concrete as the wall is poured without the need for internal stiffeners in lower portions of the tank. The liner may, for example, have a thickness of more than 8 mm. Without interference from formwork or internal stiffening, construction of a roof may begin inside the liner before the pour of the outer wall is completed, saving significant construction time.

To help maintain proper positioning of the liner during the pour of the outer concrete wall, lateral tension ties can be connected to an outward surface of the liner and used to help tie the liner to the outer formwork. In some circumstances, it may be beneficial to space these ties more closely together than the ties used in conventional arrangements; for example between ¾ and 1½ m apart, instead of more than 2 m apart.

To secure the connection between the liner and the completed concrete wall, anchor studs may be welded on an outward surface of the liner to become embedded in the concrete when the wall is poured. If thermal corner protection is desired, an annular ring of cryogenic steel can be integrated into the liner.

BRIEF DESCRIPTION OF THE DRAWINGS

The invention may be better understood by referring to the accompanying drawings, in which:

FIGS. 12 and 13 are enlarged rotated views of an anchor that can be used on the outside surface of the liner.

FIG. 14 is and enlarged side view of a stud that can be used on the outside surface of the liner.

DETAILED DESCRIPTION OF THE INVENTION

Figure 1:
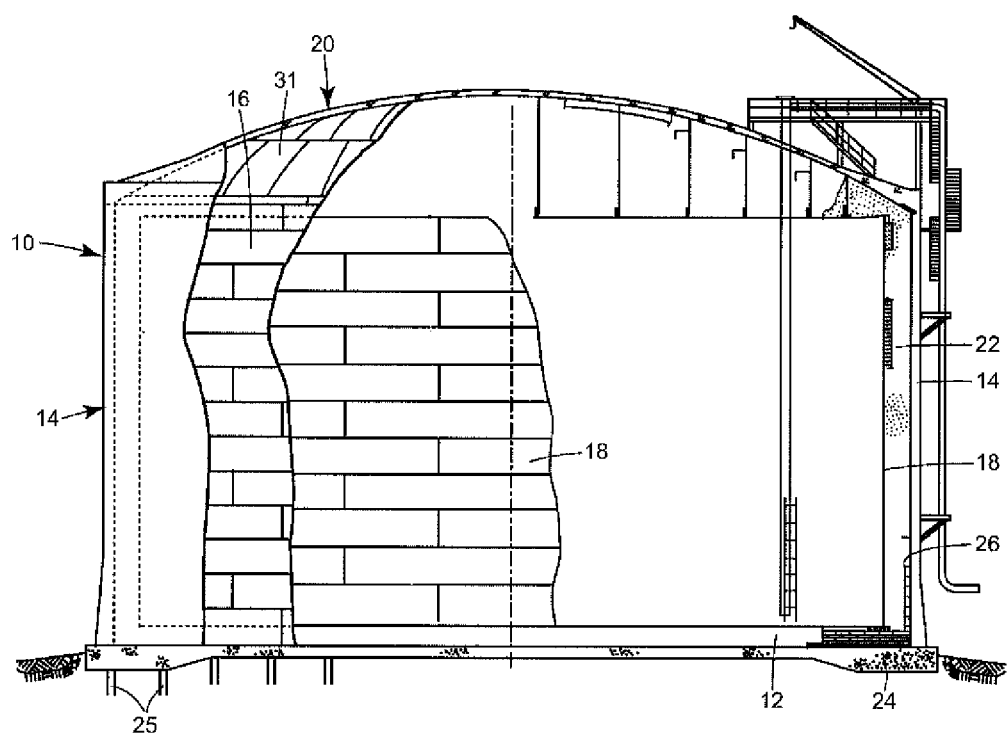
FIG. 1 is a cut-away elevational view of one embodiment of a storage tank for cryogenic liquids that incorporates this invention.

FIG. 1 illustrates one possible arrangement of a storage tank 10 that incorporates this invention. The illustrated tank is a full-containment storage tank that can be used to store cryogenic liquids like LNG. The illustrated tank 10 has flooring materials 12 (such as cellular glass insulation, a concrete bearing block, metal plates, sand or concrete leveling layers, etc.), an outer concrete wall 14 with a steel liner 16, an inner tank 18, and a roof 20. Insulation 22 is placed between the outer wall and the inner tank. These elements will be discussed briefly below, and the discussion will be followed by one example of how the illustrated tank can be built.

Elements of the Illustrated Storage Tank

The flooring materials 12 that are shown in FIG. 1 are supported by a pile cap foundation 24 on piles 25. Alternative arrangements can also be used.

The outer concrete wall 14 that is illustrated is approximately 36 meters tall, tapers from 0.5 meters to 0.8 meters thick, and has a diameter of approximately 90 meters. This provides an interior volume that is sufficient to hold the design volume of the storage tank in the event of failure of the inner tank 18. While useful, this secondary containment capacity is not necessary to practice the invention. The size and configuration of the wall can vary.

The steel liner 16 is connected to an inward-facing side of the concrete wall 14. The illustrated liner is constructed primarily using 16-mm thick steel plates. Plates with other thicknesses can also be used, so long as the resulting liner is sized and configured to withstand the forces of pouring the concrete wall without adding temporary stiffeners against the inside surface of lower portions of the liner, where the stiffeners would limit worker's access. (This will be discussed in more detail below.) Generally, it will be desirable to use plates that have a thickness of more than 8 mm.

Figure 2:
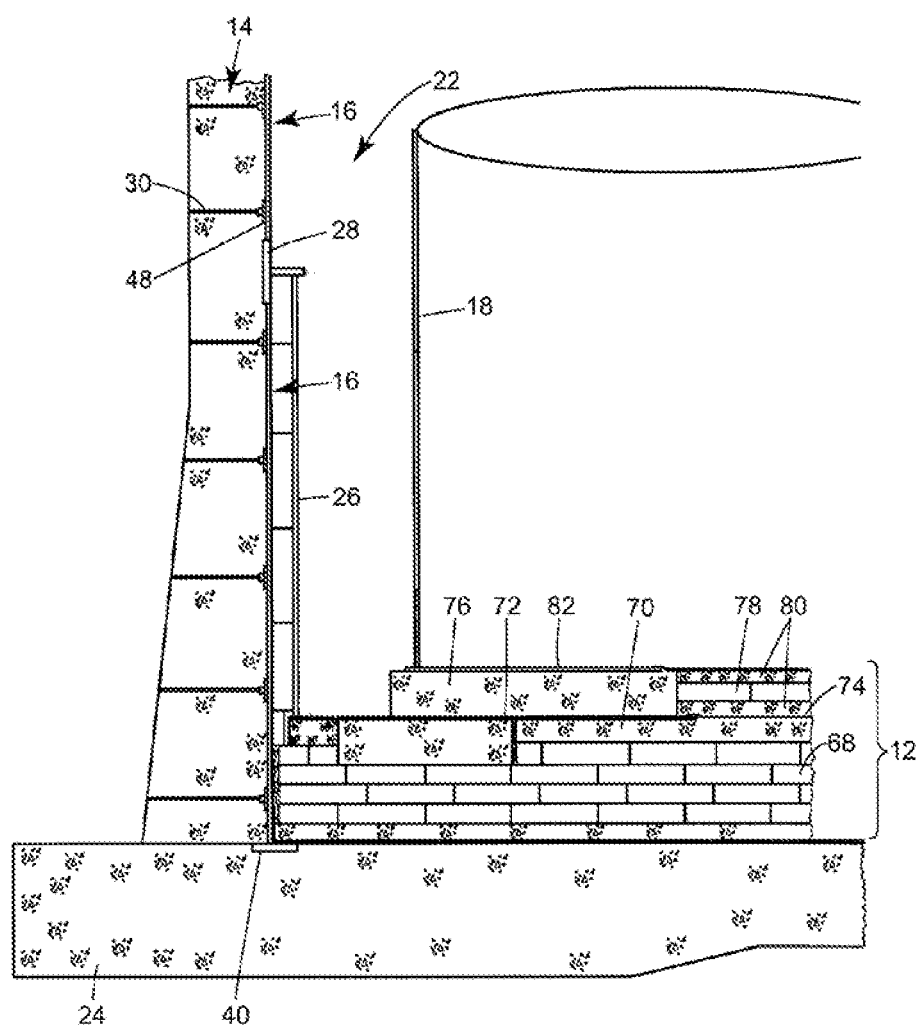
FIG. 2 is an enlarged view of a corner of the storage tank seen in FIG. 1.

The illustrated storage tank 10 includes a thermal corner protection tub 26 that can be seen in FIG. 2. This particular tub includes a cylindrical ring 28 of cryogenic steel that is integrated into the liner 16. In the illustration, the cryogenic ring 28 forms one course of the liner, being welded to adjacent upper and lower courses of non-cryogenic steel. Benefits of the invention may be derived even if such a tub is not used or if thermal corner protection is not incorporated into the liner 16. However, thermal protection is generally desired in the corners of cryogenic storage tanks in order to minimize thermal expansion/contraction forces where vertically-arranged plates are connected to horizontally-arranged plates. As seen, this detail can be incorporated into the invention.

The illustrated tank 10 can be distinguished from many conventional tanks by the close spacing of metal rods 30 that are embedded in the outer concrete wall 14 and are screwed, welded, or otherwise attached to an outward surface of the liner 16. These metal rods extend from the liner into the outer wall. As discussed below, these rods were used as tension ties to hold the inner liner to the outer formwork when pouring the wall, and are spaced more closely than in conventional tanks. The illustrated metal rods are spaced approximately 1 m apart, but this exact spacing is not required to use the invention. Generally, however, the rods will be no more than about 2 m apart, and preferably between ¾ m and 1½ m apart.

As evident from FIG. 1, the illustrated inner tank 18 can serve as a distinct primary containment wall, and is spaced inwardly from the outer wall 14. The illustrated inner tank is approximately 33 m tall and has a diameter of approximately 88 m, providing a storage capacity of approximately 185,000 cubic meters. The illustrated inner tank is made of 11.8 m×3.3 m plates of cryogenic steel, although the invention can also be used with inner tanks that are made of other materials.

The roof 20 that is illustrated in FIG. 1 is a dome roof made of concrete poured over plates on a steel frame. As discussed in more detail below, the illustrated frame 60 (FIG. 5) is fabricated in the space inside the outer wall 14 and is subsequently raised into position at the top of the tank.

Although the invention provides significant advantages when this kind of roof is used, the invention can also be used with other kinds of roofs.

The insulation 22 that is shown in FIG. 1 between the outer wall 14 and the inner tank 18 is Perlite and fiberglass blanket, but use of those materials is not necessary to the invention.

Construction of the Illustrated Tank

Various steps that can be used in building the illustrated tank 10 are illustrated in FIGS. 3-9. Briefly, the pertinent parts of the illustrated storage tank 10 can be built by erecting a freestanding inner steel liner 16 and pouring the outer concrete wall 14 between the liner and outer formwork without adding internal stiffening to the lower portions of the liner. This may allow work on the frame 60 for the roof 20 to proceed as the wall is being poured.

Figure 3:
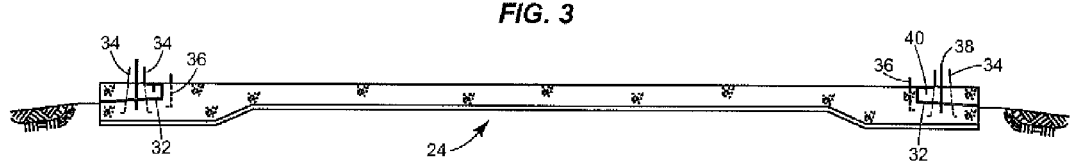
FIGS. 3-9 are elevational views showing different stages of construction of a storage tank being built using one possible variation of this invention.

FIG. 3 illustrates the completion of the foundation 24. The foundation illustrated here includes a reinforced concrete slab on a grade foundation. Other arrangements can be used. Drains 32, reinforcement starter bars 34, anchor straps 36, vertical prestress ducts 38, and annular embeds 40 such as plates, channels, or angles can be included as needed.

Figure 4:
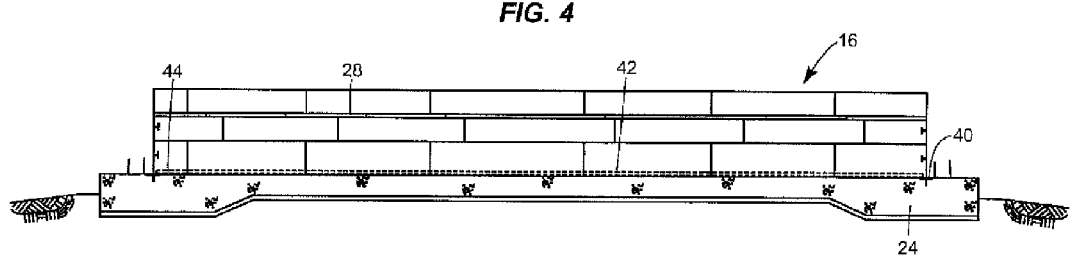

FIG. 4 shows beginning courses of the liner 16 built onto the annular embeds 40 in the foundation 24. As noted below, in some cases a cylindrical ring 28 for a thermal corner protection tub can be included in the liner. A concrete leveling course 42 can be added on top of an outer bottom vapor barrier 44.

Figure 10:
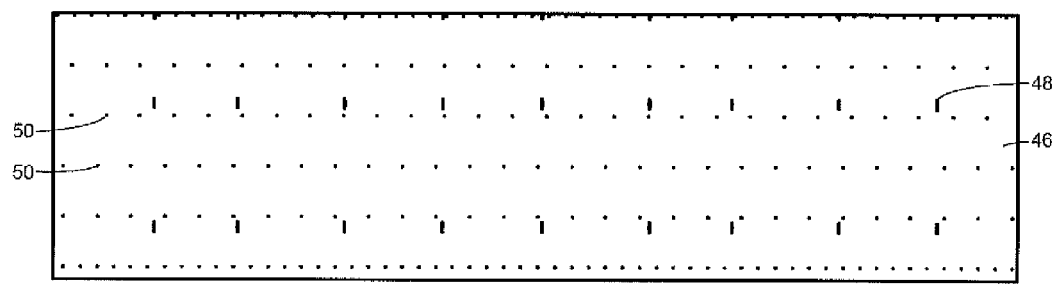
FIGS. 10 and 11 are enlarged elevational views of the outside surface of two of the plates in the liner used in the storage tank of FIG. 1.
Figure 11:
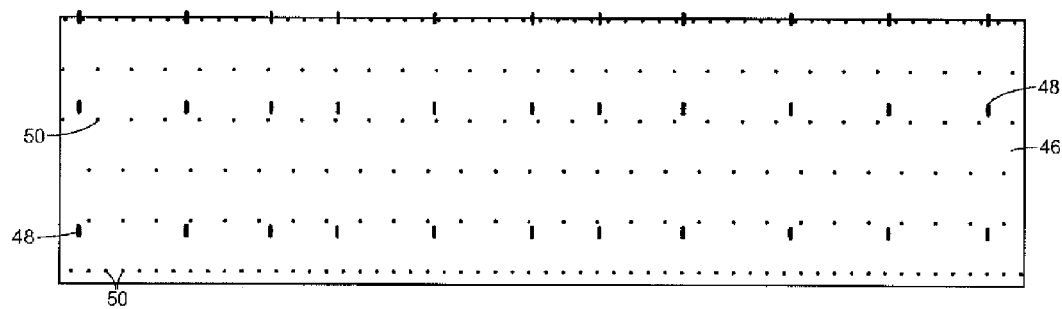

The illustrated liner 16 can be built using plates 46 such as those seen in FIGS. 10 and 11. The plates seen in those illustrations have anchor ties 48 welded to them for mounting closely-spaced lateral tension ties that can be used to secure the liner to the outer formwork when pouring the concrete wall 14. The anchor ties depicted in FIGS. 12 and 13 may be commercially available, and other types of anchor ties can also be used. The ties are spaced more closely than in conventional construction; no more than about 2 m apart and preferably between ¾ and 1½ m apart in the horizontal direction and between ¾ m and 1½ m apart in the vertical direction.

The illustrated plates 46 for the liner 16 also have anchor studs 50 that help the liner adhere to the outer wall 14 (FIGS. 10, 11, and 14). When the outer wall is poured, these studs become embedded in the concrete wall. The illustrated studs, which can be seen in more detail in FIG. 14, are made of steel and are spaced about 400 mm apart. In most cases, other materials and spacings could also be used.

Figure 5:
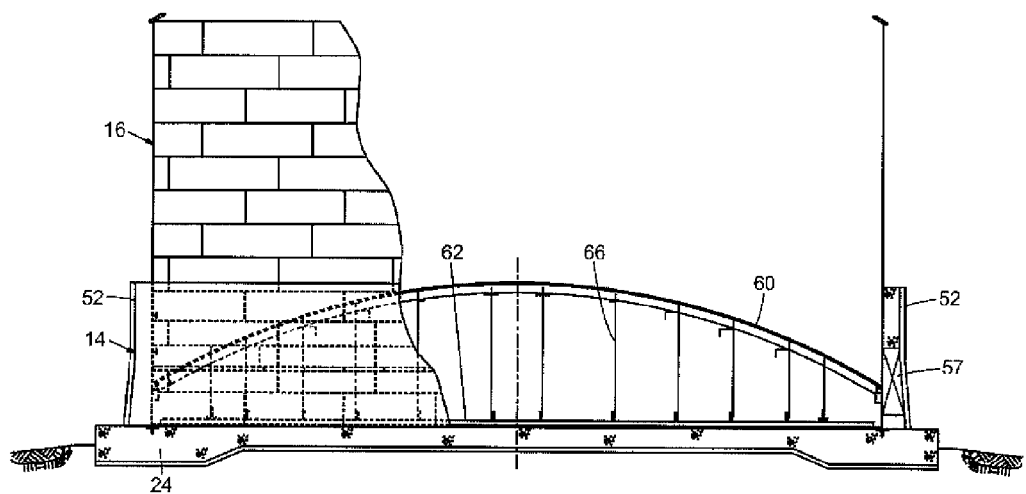
Figure 15:
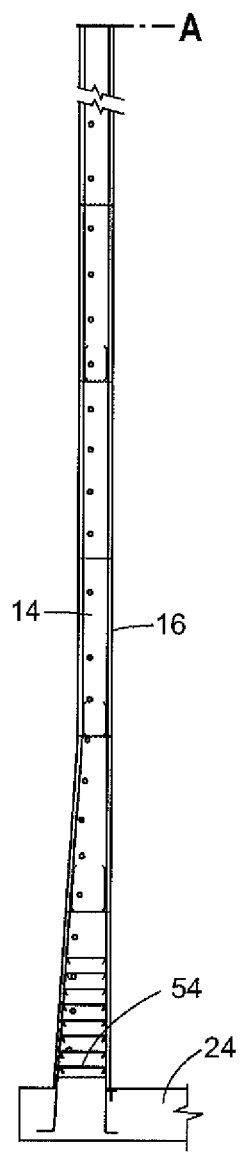
FIGS. 15 and 16 are enlarged, cross-sectional views through the lower and upper portions of the completed wall of the tank seen in FIGS. 3-9.
Figure 16:
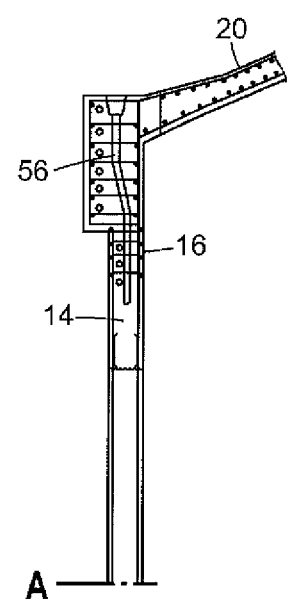
Figure 17:
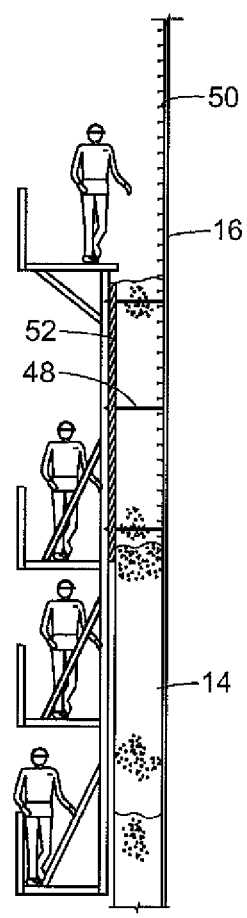
FIG. 17 is a schematic illustrating the position of outer formwork as the wall is being poured.

FIG. 5 illustrates the start of the process of pouring the concrete wall 14. In this example, formwork 52 is used to pour the wall in a series of 3½ meter high lifts. As suggested in FIG. 17, the formwork from lower lifts can be "jumped" to higher lifts as work progresses. Reinforcing bars 54 (FIG. 15), post-tensioning ducts 56 (FIG. 16), other embeds, and forms for temporary construction openings 57 (FIG. 5) can be placed as needed before each lift is poured. Metal rods 30 that serve as tension ties (FIG. 2) are connected to the anchor ties 48 and used to maintain the desired spacing between the liner 16 and the outer formwork 52. After the pour is completed and the outer formwork is removed, ends of the tension ties that may project beyond the outer surface of the concrete wall can be cut off, leaving portions of the original rods within the wall.

As work on the wall 14 proceeds, construction of the liner 16 can be completed. Where needed, temporary internal or external stiffening can be added to upper portions of the liner to provide wind resistance and roundness control. Eliminating the use of stiffeners attached to the interior surface of the liner in lower portions of the tank preserves room on the interior floor 12 so that steel workers who erect the liner can immediately begin work on the frame 60 (FIG. 5) for the roof and on a deck 62 (FIG. 5), without the need to wait for concrete workers to pour the wall and subsequently remove the formwork that would otherwise reside in the interior space.

Figure 6:
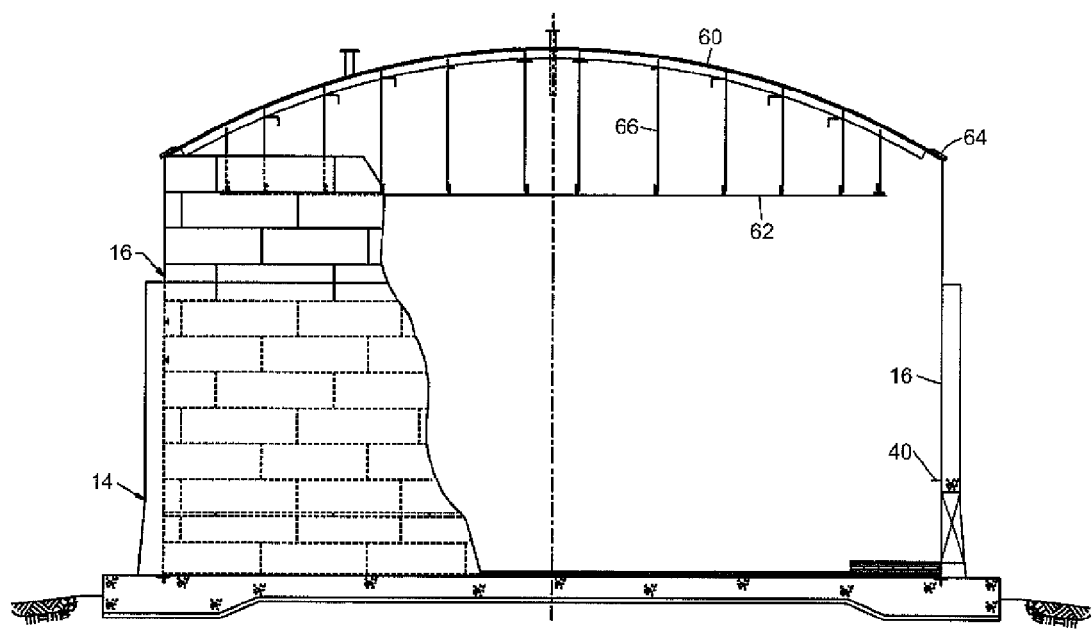

FIG. 6 shows that, after the liner 16 is completed, the frame 60 for the roof 20 and the deck 62 can be raised or placed into position. The raised frame can be connected to a compression bar 64 mounted on the top edge of the liner. Roof plates 31 (FIG. 1) supported by the roof frame may be installed either before of after the frame is positioned. The deck can be suspended from the frame using deck rods 66. Once the deck is raised, miscellaneous work inside the tank, such as installation of layers of cellular glass insulation 68, an overlying sand course 70, and an annular bottom plate 72 (all best seen in FIG. 2), can be completed. As seen in FIG. 6, the frame for the roof may sometimes be positioned even before the final lift of the concrete wall is completed, resulting in a significant shortening of the usual construction schedule.

Figure 7:
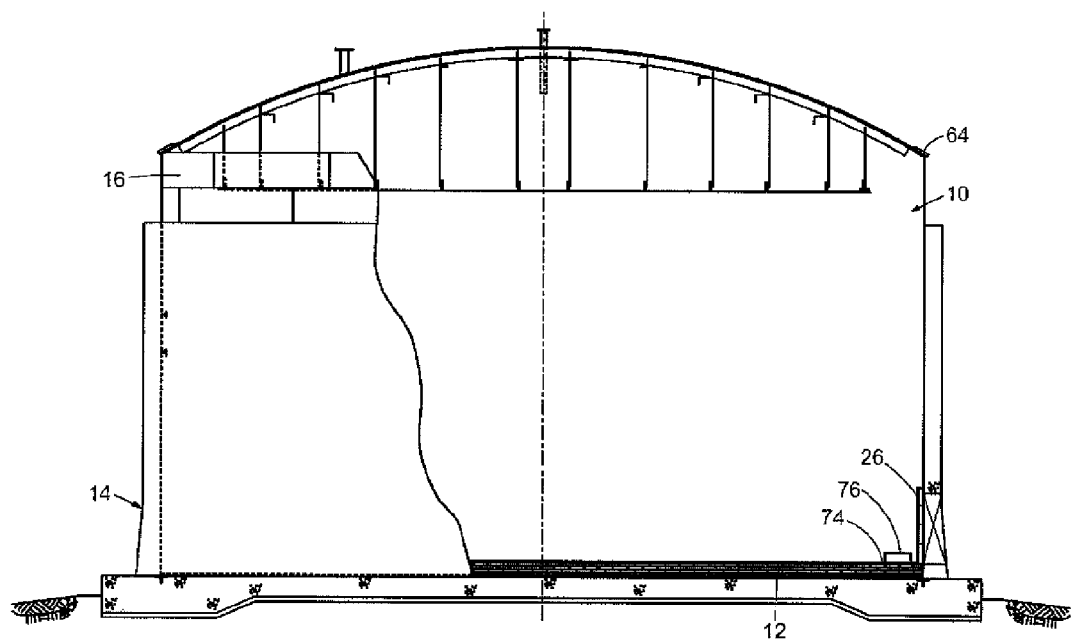

FIG. 7 illustrates continued work on the concrete wall 14 while the work inside the tank 10 proceeds. In this illustration, work on the thermal corner protection tub 26 has commenced, and steel plates for a secondary containment bottom 74 and a concrete ring beam 76 have been installed over some of the previously-laid flooring materials 12.

Figure 8:
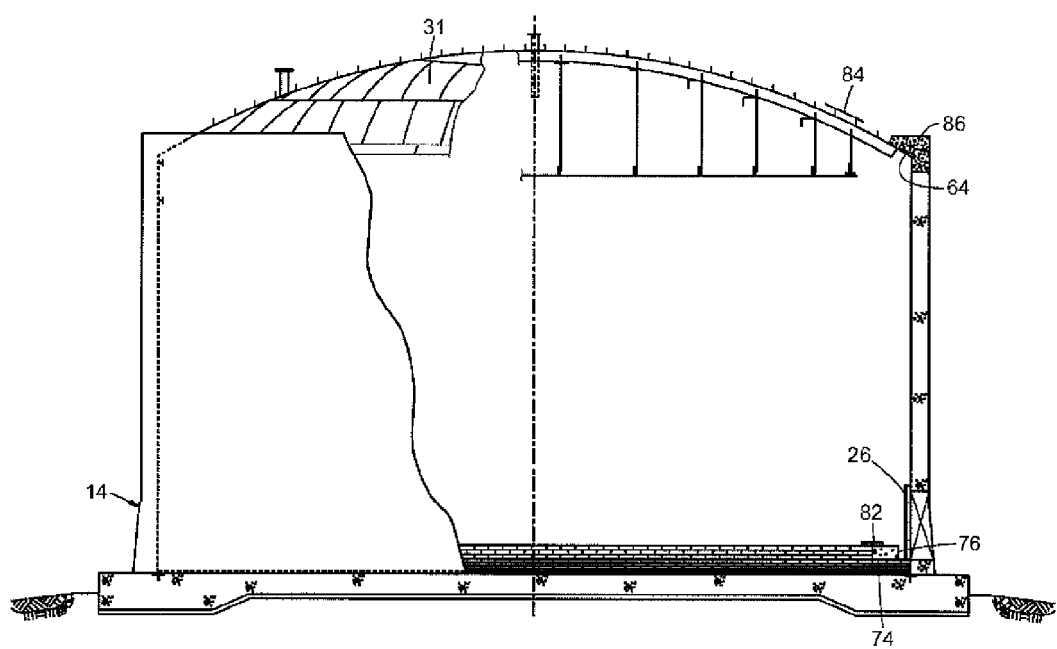

FIG. 8 illustrates continued work on the bottom of the inner tank 18 (FIG. 1) as the final lift of the outer wall 14 is completed. At this stage, another layer of insulation 78 and another sand course 80 (best seen in FIG. 2) have been added above the secondary containment bottom 74, and an inner tank annular plate 82 has been positioned on the concrete ring beam 76. On the roof, rebar 84 has been placed for pouring concrete over the roof plates 31 and a concrete corbel 86 has been added at the top of the wall, covering the compression bar 64.

Figure 9:
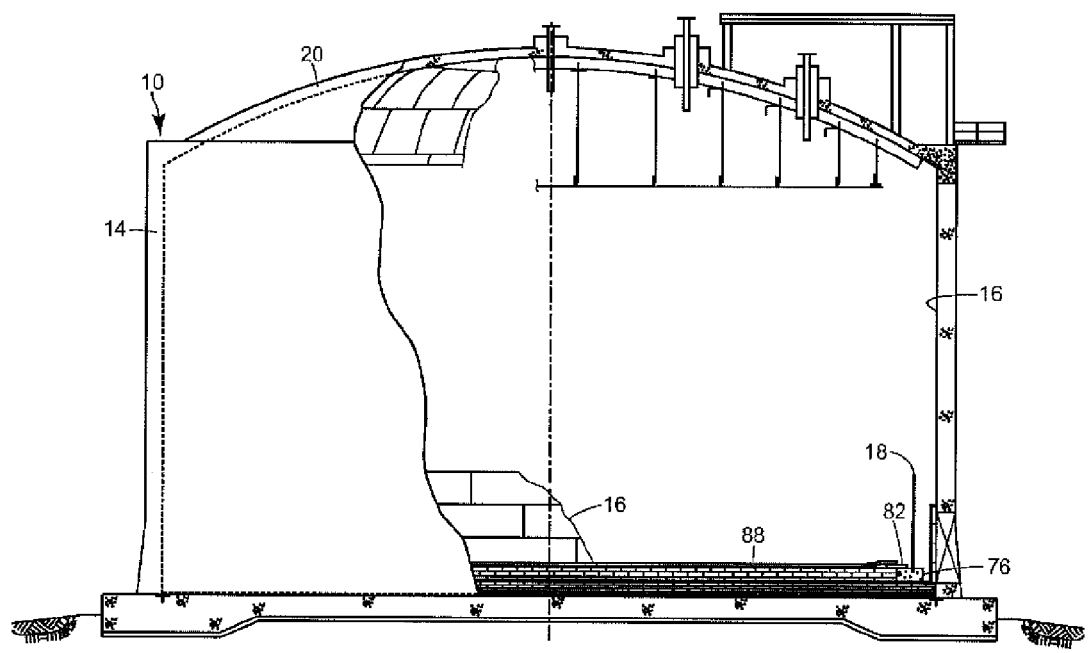

FIG. 9 illustrates the completion of the pour of the roof 20 and continued work on the inner tank 18. In this illustration, an inner tank bottom plate 88 has been extended over the upper sand course 80 (seen in FIG. 2) and connected to the inner tank annular plate 82, and work on the shell for the inner tank 18 has begun.

This description has been provided for illustrative purposes. Revisions or modifications may be apparent to those of ordinary skill in the art without departing from the essence of the invention. The full scope of the invention is set forth in the following claims.

What is claimed is:

1. A storage tank that has:
   a concrete wall with an inward-facing side;
   a steel liner on the inward-facing side of the concrete wall, the steel liner being sized and configured to withstand the forces of pouring the concrete wall without temporary stiffeners attached to an interior surface of the liner in lower portions of the tank;
   a plurality of metal rods directly attached to an outward surface of the liner, the plurality of metal rods extending from the outward surface of the liner through the concrete wall to an outer surface of the concrete wall; and
   a distinct primary containment wall, wherein the liner is spaced outward from the primary containment wall with a circumferential gap between the primary containment wall and the liner.

2. A storage tank as recited in claim 1, in which the liner has a thickness of more than 8 mm.

3. A storage tank as recited in claim 1 that also has a thermal corner protection tub with a cylindrical ring of cryogenic steel that is integrated into the liner.

4. A storage tank as recited in claim 1, wherein the rods are spaced no more than about 2 m apart.

5. A storage tank as recited in claim 1, wherein the rods are spaced between ¾ m and 1½ m apart.

6. A storage tank as recited in claim 1, in which the concrete wall is an outer wall.

7. A storage tank as recited in claim 3, the thermal corner protection tub being placed in the storage tank after the start of the pouring the concrete wall.

8. A storage tank that has:
   a concrete wall with an inward-facing side;
   a steel liner on the inward-facing side of the concrete wall;
   a plurality of metal rods attached to an outward surface of the steel liner, the plurality of metal rods extending through the concrete wall to an outer surface of the concrete wall,
   the steel liner being sized and configured without temporary stiffeners attached to an interior surface of the steel liner in lower portions of the tank; and
   an inner tank spaced at least 1 meter inward from the steel liner.

* * * * *